(12) United States Patent
Zhu et al.

(10) Patent No.: US 8,781,790 B2
(45) Date of Patent: Jul. 15, 2014

(54) RETURN PULSE SHAPE ANALYSIS FOR FALLING EDGE OBJECT DISCRIMINATION OF AEROSOL LIDAR

(75) Inventors: Xiang Zhu, Richmond (CA); Stéphane Louis Gagnon, Ottawa (CA)

(73) Assignee: Neptec Design Group Ltd., Ontario (CA)

(*) Notice: Subject to any disclaimer, the term of this patent is extended or adjusted under 35 U.S.C. 154(b) by 376 days.

(21) Appl. No.: 13/127,945

(22) PCT Filed: Nov. 5, 2008

(86) PCT No.: PCT/CA2008/001950
§ 371 (c)(1),
(2), (4) Date: Aug. 16, 2011

(87) PCT Pub. No.: WO2010/051615
PCT Pub. Date: May 14, 2010

(65) Prior Publication Data
US 2011/0313722 A1  Dec. 22, 2011

(51) Int. Cl.
*G01B 5/02* (2006.01)
*G01C 3/08* (2006.01)
*G01S 13/00* (2006.01)

(52) U.S. Cl.
USPC .......................... 702/159; 356/3.01; 342/95

(58) Field of Classification Search
USPC ......... 702/159, 1–2, 81, 84–85, 97, 127, 158, 702/172, 188–189; 356/3, 3.01, 3.03, 4.01, 356/4.07, 5.01, 5.05, 5.11, 27–28, 356/141.1–141.2, 141.4, 432, 438; 342/33, 342/54, 63, 65, 73, 90–91, 95, 118, 145, 342/205; 340/945, 952, 956, 961; 700/16, 700/301

See application file for complete search history.

(56) References Cited

U.S. PATENT DOCUMENTS 4,709,142 A  11/1987  Dahl
(Continued)

FOREIGN PATENT DOCUMENTS

CA  2053758 C  4/1993
EP  0301045 B1  1/1989
(Continued)

OTHER PUBLICATIONS

Zhu et al., LIDAR for Obstacle Detection During Helicopter Landing, Apr. 16, 2008, SPIE 6950, Laser Radar Technology and Applications XIII, 69500T, 8 pp.*
(Continued)

*Primary Examiner* — Toan Le
(74) *Attorney, Agent, or Firm* — Faegre Baker Daniels LLP

(57) ABSTRACT

A LIDAR optical remote sensing system and method analyzes the falling edge profile of a return LIDAR signal that may be indicative of an object or an aerosol cloud, which is generally more diffuse. Using the falling edge profile permits burnthrough to an object that may be obscured by the aerosol cloud. The profile is compared against at least one threshold that may correspond, in various embodiments, to a negative slope of the falling edge, an integrated power under the falling edge, or a range estimate error for varying transmitted power values, varying transmitted pulse lengths and/or varying receiver detector field of view values.

36 Claims, 12 Drawing Sheets

(56) References Cited

U.S. PATENT DOCUMENTS

| | | | |
|---|---|---|---|
| 5,116,124 A | | 5/1992 | Huttmann |
| 5,221,928 A | * | 6/1993 | Dahl ............................ 342/205 |
| 5,298,905 A | * | 3/1994 | Dahl ............................ 342/54 |
| 5,889,490 A | | 3/1999 | Wachter et al. |

FOREIGN PATENT DOCUMENTS

| | | |
|---|---|---|
| WO | WO8805900 A1 | 8/1988 |
| WO | WO2007025363 A1 | 3/2007 |
| WO | WO2007046875 A2 | 4/2007 |

OTHER PUBLICATIONS

Cameron et al., Remote Optical Imagery of Obscured Objects in Low-Visibility Environments Using Parametric Amplification, Mar. 1998, Meeting of the IRIS Specialty Group on Active Systems, 21 pp.*
Zhu et al. Reference Abstract, Apr. 16, 2008, 2 pp.*
International Search Report and Written Opinion issued in PCT/CA2008/001950, mailed Jul. 20, 2009, 8 pages.
Bissonnette, L.R., "Multiple Scattering of Narrow light Beams in Aerosols", Applied Physics B 60, 315-323 (1995).

* cited by examiner

RETURN PULSE SHAPE ANALYSIS FOR FALLING EDGE OBJECT DISCRIMINATION OF AEROSOL LIDAR

CROSS-REFERENCE TO RELATED APPLICATIONS

The present application is a national phase application, filed pursuant to 35 U.S.C. §371, of PCT/CA2008/001950 that was filed Nov. 5, 2008, said application being incorporated herein by reference in its entirety.

BACKGROUND

Helicopters are an invaluable resource in a wide variety of operational scenarios, both civilian and military. The ability to take off and land effectively vertically is convenient, especially in remote or cramped quarters.

However, the very features that make helicopter operations so invaluable also cause significant challenges. Helicopter pilots are frequently called upon to land or hover over terrain under adverse topographical, topological, meteorological and even situational constraints. Many landings or near landings (in which the helicopter is called upon to hover just above ground level for a considerable period of time while personnel and/or materials are loaded on or off the helicopter) take place on or over rough terrain, such as mountainous regions, building roofs, expanses of soil or sand or even bodies of water. Such operations may be undertaken at night, in winter, and/or during foggy and/or storm conditions.

As a result, it is not uncommon for such landing operations to take place inside an aerosol cloud. For the purposes of the present disclosure, aerosols are small particles suspended in the atmosphere. In the context of helicopter operations, the aerosol may be as a result of prevailing weather phenomena, such as fog or a snow storm, man-made clouds from industrial pollutants, smoke from combusting biomass, or sand, snow, water or dust particles stirred up into a dense cloud by the rotor wash of the helicopter or of a neighboring helicopter.

Under these conditions, pilots cannot see, easily or at all, nearby objects that provide the visual references that enable them to safely control the helicopter near the ground.

In order to ensure safe flight operations, especially during landing and near landing operations, the ability to detect obstacles, such as the terrain features or objects situated thereon, such as trees, animals and humans, vehicles and structures, within an aerosol cloud, is beneficial.

There have been many reported accidents due to brownout and whiteout conditions arising from helicopter rotor wash in both civil and military aviation.

In recent years, the search for a solution has become a high priority for the military, because of the extensive use of helicopter operations in desert regions.

The United States Defense Advanced Research Projects Agency (DARPA) has initiated efforts for many years to develop technologies to assist pilots see through dust during helicopter landings, including the "Sandblaster" program that hopes to test a landing system in September 2008 that promises safer flying for military helicopters in brownout conditions.

Despite efforts by both military and civilian aviation entities, no effective long-term solution to the brownout/whiteout rotor wash problem, or the problem of detecting obstacles within an aerosol cloud generally, has been developed.

It is generally agreed that active sensors, which have the ability of using certain features to discriminate between aerosol and object response provide promising options.

One approach that has been investigated is LIght Detection And Ranging (LIDAR), an optical remote sensing technology that measures properties of scattered collimated light to find range and/or other information of a distant object, typically using laser pulses.

Other approaches include millimeter-wave (MMW) radar and flash LIDAR and range-gated cameras. All of these mechanisms rely on timing discrimination to suppress aerosol signals.

Like radar technology, which uses radio waves instead of light, in LIDAR, an object's range is calculated by measuring the time delay or time of flight (TOF) between transmission of a pulse and detection of a reflection thereof off of the object.

It is theoretically possible to image a feature of an object about the same size as the wavelength of the transmitted pulse, or larger. Because shorter wavelengths in the electromagnetic spectrum are used in LIDAR relative to radar, typically in the ultraviolet, visible or near infrared spectra, LIDAR is highly sensitive to aerosols.

By contrast, the longer wavelength of MMW radar permits it to penetrate deep inside aerosol clouds but provides poor spatial resolution. Additionally, there are significant engineering issues in providing a scanning MMW radar within a compact package.

In a flash LIDAR, an avalanche photo diode (APD) is used to measure TOF and the corresponding distance to a different spot of the object in response to a flash pulse directed at the target, thus providing a 3D ranging solution from a single flash.

While both flash LIDAR and range-gated cameras are able to image the full field of view (FOV) in a single shot and provide high resolution and frame rate, they both lack any substantial ability to penetrate aerosol because the light sources in such devices are spread into the full FOV for each shot.

Scanning LIDAR systems thus pose an optimized trade-off between aerosol penetration and resolution.

The difficulty is in discriminating between returns corresponding to an object and returns corresponding to the surrounding aerosol cloud.

Since aerosols play an important role in environment, they have been investigated by both ground-based LIDARs and space-based LIDARs and the fundamentals of LIDAR response to aerosols have been intensively studied. As a result, the principles of the interaction between LIDAR and aerosols have been well established, for example in studies on pollution monitoring and climate research. However, in such circumstances, the aerosol cloud is relatively extensive, ranging on the order of 1 km in extent, and is of small density.

On the other hand, aerosols generated by helicopter rotor wash, or indeed atmospheric aerosols such as fog and snow/dust storms, are relatively dense and tend to be much more closely localized to the helicopter, typically on the order of 0 m to 100 m. Despite this, the aerosol cloud remains much less dense than an object.

SUMMARY

According to a first embodiment of the present disclosure there is disclosed a remote sensing system for obtaining range information about an object in a predetermined direction, the system comprising: a pulsed signal source for emitting at least one pulsed signal; a transceiver for directing the at least one pulsed signal in the predetermined direction and for receiving at least one return signal associated with the at least one pulsed signal from along the predetermined direction; at least one detector, each for gathering the at least one return signal from the transceiver; a signal processor for: correlating at least one falling edge of the at least one return signal gathered by each of the at least one detectors, with a falling edge of the at least one pulsed signal and determining therefrom a range from the system to a reflecting entity in the predetermined direction; comparing a feature of one of the at least one falling edges of the at least one return signal against at least one threshold to characterize the reflecting entity as being from the object or from an obscuring aerosol cloud; and discarding the range associated with the at least one falling edge if the reflecting entity is characterized as being from the aerosol cloud.

According to a second embodiment of the present disclosure there is disclosed a method for obtaining range information about an object in a predetermined direction, the method comprising the acts of a) emitting at least one pulsed signal in the predetermined direction; b) receiving at least one return signal associated with the at least one pulsed signal from along the predetermined direction; c) gathering the at least one return signal at at least one detector; d) correlating at least one falling edge of the at least one return signal gathered by each of the at least one detectors, with a falling edge of the at least one pulsed signal and determining therefrom a range from the system to a reflecting entity in the predetermined direction; e) comparing a feature of one of the at least one falling edges of the at least one return signal against at least one threshold to characterize the reflecting entity as being from the object or from an obscuring aerosol cloud; f) discarding the range associated with the at least one falling edge if the reflecting entity is characterized as being from the aerosol cloud; and g) returning either the range associated with the object or the absence of any object for a predetermined distance in the predetermined direction.

According to a third embodiment of the present disclosure there is disclosed a signal processor operatively coupled to a remote sensing system for obtaining range information about an object in a predetermined direction, comprising: a) a correlator for determining, from a falling edge of at least one pulsed signal emitted in the predetermined direction and at least one falling edge of at least one return signal from a reflecting entity associated with the at least one pulsed signal gathered by at least one detector from along the predetermined direction, a range from the system to the reflecting entity in the predetermined direction; and b) a comparator for comparing a feature of each of one of the at least one falling edges of the at least one return signal against at least one threshold to characterize the reflecting entity as being from the object or from an obscuring aerosol cloud, whereupon the range may be discarded.

According to a fourth an embodiment of the present disclosure there is disclosed a computer-readable medium in a processor operatively coupled to a remote sensing system for obtaining range information about an object in a predetermined direction, the medium having stored thereon, computer-readable and computer-executable instructions which, when executed by the processor, cause the processor to perform acts comprising: a) determining, from a falling edge of at least one pulsed signal emitted in the predetermined direction and at least one falling edge of at least one return signal from a reflecting entity associated with the at least one pulsed signal gathered by at least one detector from along the predetermined direction, a range from the system to the reflecting entity in the predetermined direction; b) comparing a feature of each of one of the at least one falling edges of the at least one return signal against at least one threshold to characterize the reflecting entity as being from the object or from an obscuring aerosol cloud; and c) discarding the range if the reflecting entity is characterized as being from the aerosol cloud.

DRAWINGS

The embodiments of the present disclosure will now be described by reference to the following figures, in which identical reference numerals in different figures indicate identical elements and in which.

DESCRIPTION

Figure 1:
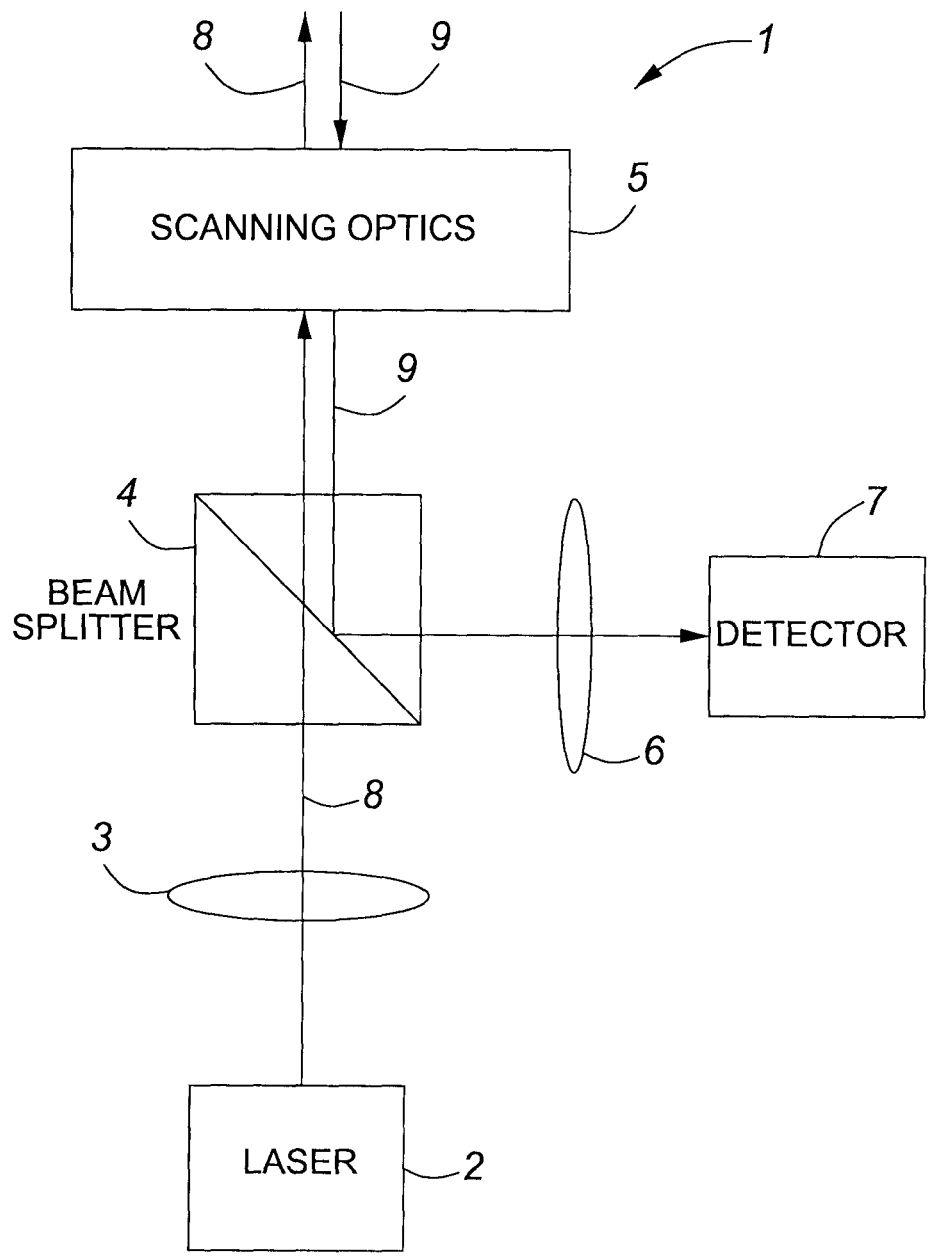
FIG. 1 is a schematic diagram of a conventional co-aligned LIDAR optical system using a beam splitter.

A LIDAR optical remote sensing system and method is disclosed that discriminates between aerosol and object returns. The method involves analyzing the falling edge profile of the return signal that is typically used for ranging purposes in order to identify whether the signal was reflected off an object or an aerosol cloud. An aerosol cloud is more diffuse than an object and the falling edge of the return signal reflects this characteristic.

The method involves a comparison of the falling edge profile against at least one threshold. The threshold may correspond, in various embodiments, to a negative slope of the falling edge, an integrated power under the falling edge or a range estimate error using the falling edge for varying transmitted power values, varying transmitted pulse lengths and/or varying receiver detector field of view values.

The present disclosure will now be described in detail for the purposes of illustration only, in conjunction with certain embodiments shown in the enclosed drawings.

Typically, LIDAR optical systems perform two complementary functions, namely to launch a collimated beam at an object (which may be ground or a surface feature) and to receive scattered light from the object. As a general rule, the larger the optics the higher the detection sensitivity for a given laser power. However, the trade-off of a larger optical system is that it generally has a slower FOV scanning rate. This trade-off may be balanced by suitable design of the optical system, which generally can be divided into two groups, namely monostatic optics and bistatic optics.

Monostatic LIDAR optical designs have the launch beam and the return beam co-aligned. A simple example monostatic LIDAR system is schematically shown in prior art FIG. 1, in which the system 1 includes a laser source 2, a first lens 3, a beam splitter 4, an optical scanner 5, a second lens 6 and a detector 7. A pulsed launch laser beam 8 from the laser source 2 passes through the first lens 3 and beam splitter 4 to the optical scanner 5, which controls the beam direction to project the launch beam 8 onto an object (not shown) whose range is to be measured. The optical scanner 5 also receives laser light reflected from the object and is arranged so that the component of the return beam 9 between the object and the optical scanner 9 that is co-aligned with the projected beam 15 from the optical scanner 5 always falls on the detector 7. The beam splitter 4 reflects the return beam 9 at 90° onto the detector 7 via the second lens 6. The range is measured using a TOF technique based on the time interval between the pulsed, projected and detected beams.

Figure 2:
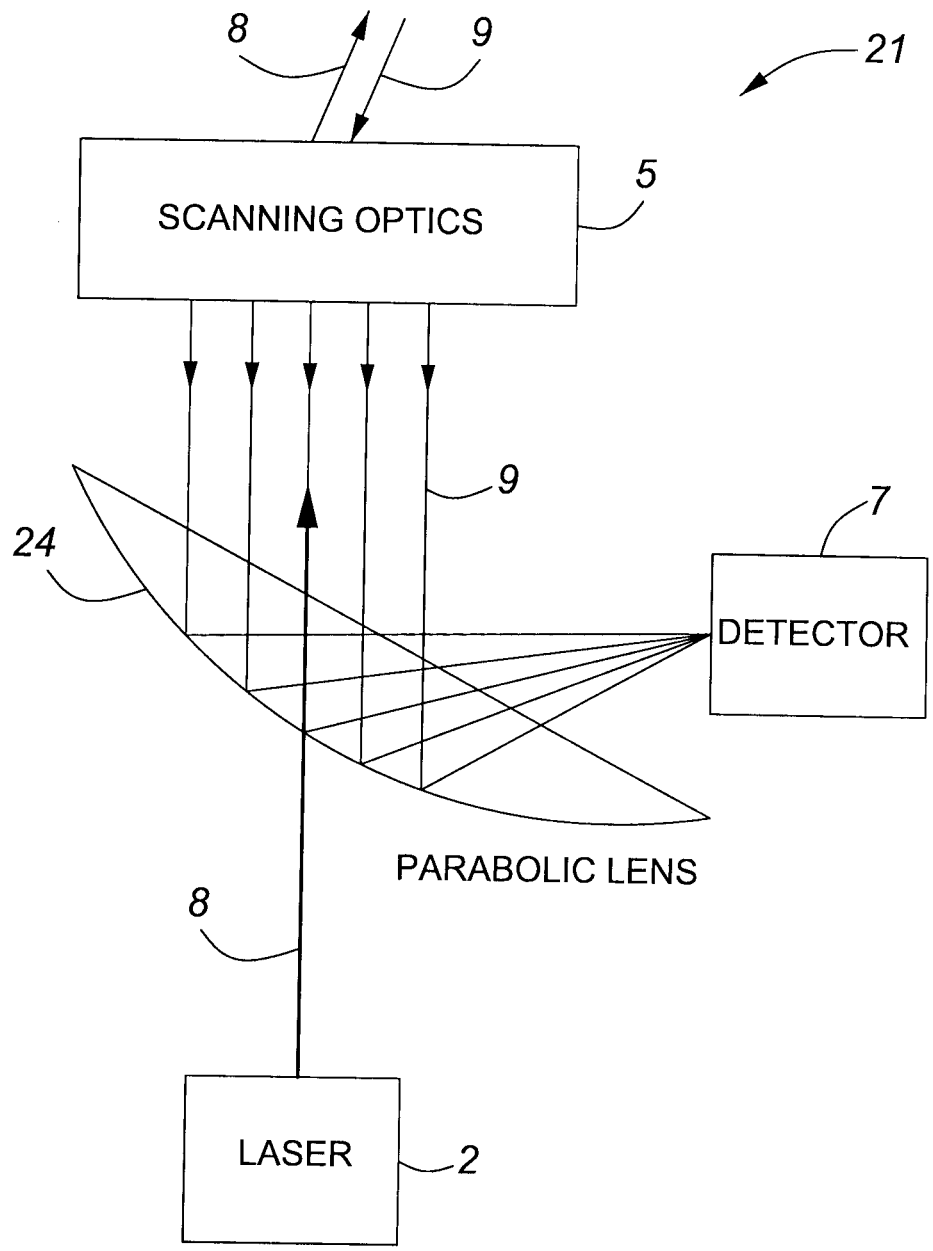
FIG. 2 is a schematic diagram of a conventional co-aligned LIDAR optical system using a parabolic lens.

Prior art FIG. 2 shows another example of a monostatic LIDAR optical system which measures range using TOF but which dispenses with the beam splitter 4. The system 21 includes laser source 2, a parabolic mirror 24, optical scanner 5 and detector 7. A pulsed, launch laser beam 8 from the laser source 2 passes through an opening in the parabolic mirror 24 to the optical scanner 5, which directs launch beam 8 onto an object (not shown) whose range is to be measured. The optical scanner 5 receives a return beam 9 reflected from the object and which is co-aligned with the launch beam 8, directs the return beam 9 onto the parabolic mirror 24, which reflects and focuses the return beam 9 onto the detector 7.

A key constraint for the monostatic LIDAR optical systems shown in FIGS. 1 and 2 is that the return beam 9 is co-aligned with the launch beam 8 when it hits the optical scanner 5, so that the return beam 9 will always fall on the detector 7, irrespective of the scanning direction. A drawback of these monostatic co-aligned optical systems is the very large dynamic range called for.

The LIDAR return signal equation for scattering of incident light pulses by the aerosol particles, set out in Equation (1) below assumes a single scattering process with a 180° scattering angle and that light from all other scattering does not enter the LIDAR receiver optics and is lost (in fact, the scattering of incident light pulses by the aerosol particles more correctly comprises a multiple scattering process, so that rigorous analysis of the LIDAR return would normally call for Monte Carlo simulation such as is discussed by Bissonnette, L. R. "Multiple scattering of narrow light beams in aerosols", Appl. Phys. B60, 315-323 (1995), which document is incorporated herein by reference in its entirety):

$$P_s(R) \alpha P_0 \times \beta(R) \times \exp\left[-2\int_0^R \alpha(R')dR'\right] \times \frac{A}{R^2} \quad (1)$$

where R is the range of the location where scattering occurs,

P(R) is the LIDAR returned power from scattering at range R, $P_0$ is the LIDAR launch pulse power, P $\beta(R)$ is the back scattering coefficient of the aerosol at range R, $\alpha(R)$ is the absorption coefficient of the aerosol at range R, and A is the area of the receiving lens.

The LIDAR return signal equation for returned pulses by a target or obstacle is set out in Equation (2) below:

$$P_t(R) \alpha P_0 \times \varepsilon \times \exp\left[-2\int_0^R \alpha(R')dR'\right] \times \frac{A}{R^2} \quad (2)$$

where R is the range to the target, and $\epsilon$ is the target reflectance.

For a uniform aerosol cloud, $\beta(R)$ and $\alpha(R)$ will be constants and independent of range R. By contrast, P(R) is proportional to $$\frac{\exp(-2\alpha R)}{R^2}$$

so that it decreases rapidly with the range R. Indeed, even for a moderate value of $\alpha$=0.05/m, P(R) decreases by more than 8 orders of magnitude as the range increases from 1 m to 100 m. On the other hand, the return signal decreases only 4 orders of magnitude at 100 m without aerosol attenuation.

This has two implications for LIDAR design. First, the initial pulse power $P_0$ should be high in order to penetrate the aerosol, reach an object and permit some reflected light to be received by the receiving optics.

Second, if a LIDAR is to have a sensitivity to detect weak return signals from a distant object, the system should have an extremely high dynamic range, such as in excess of $10^8$, in order to prevent the scattering from the nearby aerosol cloud from saturating the system.

Current technologies can satisfy these design objectives. High power pulse lasers with a peak power of 10 kW at 10 kHz pulse repetition frequency (PRF) are readily available and standard avalanche photodiode (APD) receivers can have a detection limit of 10 nW. In such circumstances, the ratio of launch power to return power is on the order of $$10^{12} = \frac{10 \text{ kW}}{10 \text{ nW}}.$$

However, the dynamic range of conventional detection electronics is normally less than $10^5$ (50 dB).

For example, if a LIDAR is designed to have a range from 0.5 m to 3 km, according to Equation (2), the dynamic range will be about $$10 \log\left(\frac{3000}{0.5}\right)^2 = 75.5 \text{ dB}$$

before even considering the variation of the object reflectance. Thus, such systems are not useful to detect objects at very short range due to saturation of the receiving detector.

Another drawback of such systems is the difficulty in detecting objects located in an aerosol cloud. The aerosol particles close to the LIDAR instrument will reflect projected light back into the detector 7 and the intensity of such locally reflected light may be much higher than the co-aligned component of light reflected from the distant object or object, so that the small signal cannot be easily separated from the noise at the low sensitivity setting of the detector 7 chosen to maintain it in a non-saturated state.

Figure 3:
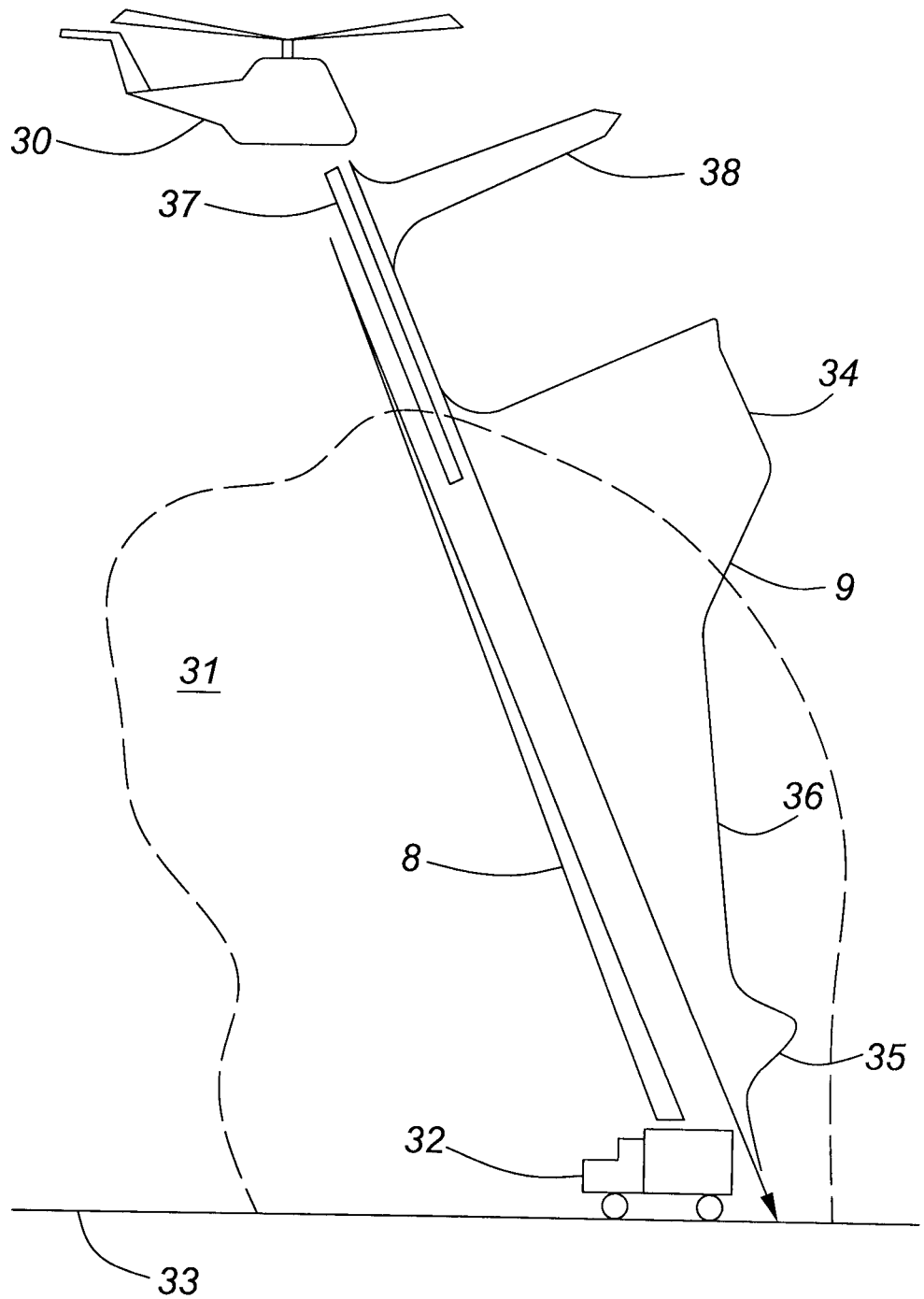
FIG. 3 is a representational depiction of a conventional helicopter-mounted version of the apparatus of FIG. 2 using rising edge detection of an object within an aerosol cloud.

FIG. 3 shows the response to a conventional helicopter 30 mounted LIDAR conventionally conditioned on a rising edge detection, such as is embodied in FIG. 1 to an aerosol cloud (shown as a shaded region) 31 surrounding an object 32, which may be located on the ground 33. It can be seen that the LIDAR return beam 9 measured by the detector 7 in response to the launch laser pulse 8 is saturated at a point 34 corresponding to the nearby aerosol scattering. Since the pulse 35 corresponding to the object 32 buried within the aerosol cloud 31 is not separated from the pulse 36 corresponding to the aerosol cloud 31, such receivers 21 can only report the range, shown schematically by the solid line 37, to the leading edge of the aerosol cloud 31 in a typical brownout scenario, such as is modeled here.

Still another drawback is that the presence of the beam splitter 7 and/or the parabolic mirror 24 effectively attenuates the rejected and reflected beams.

Figure 4:
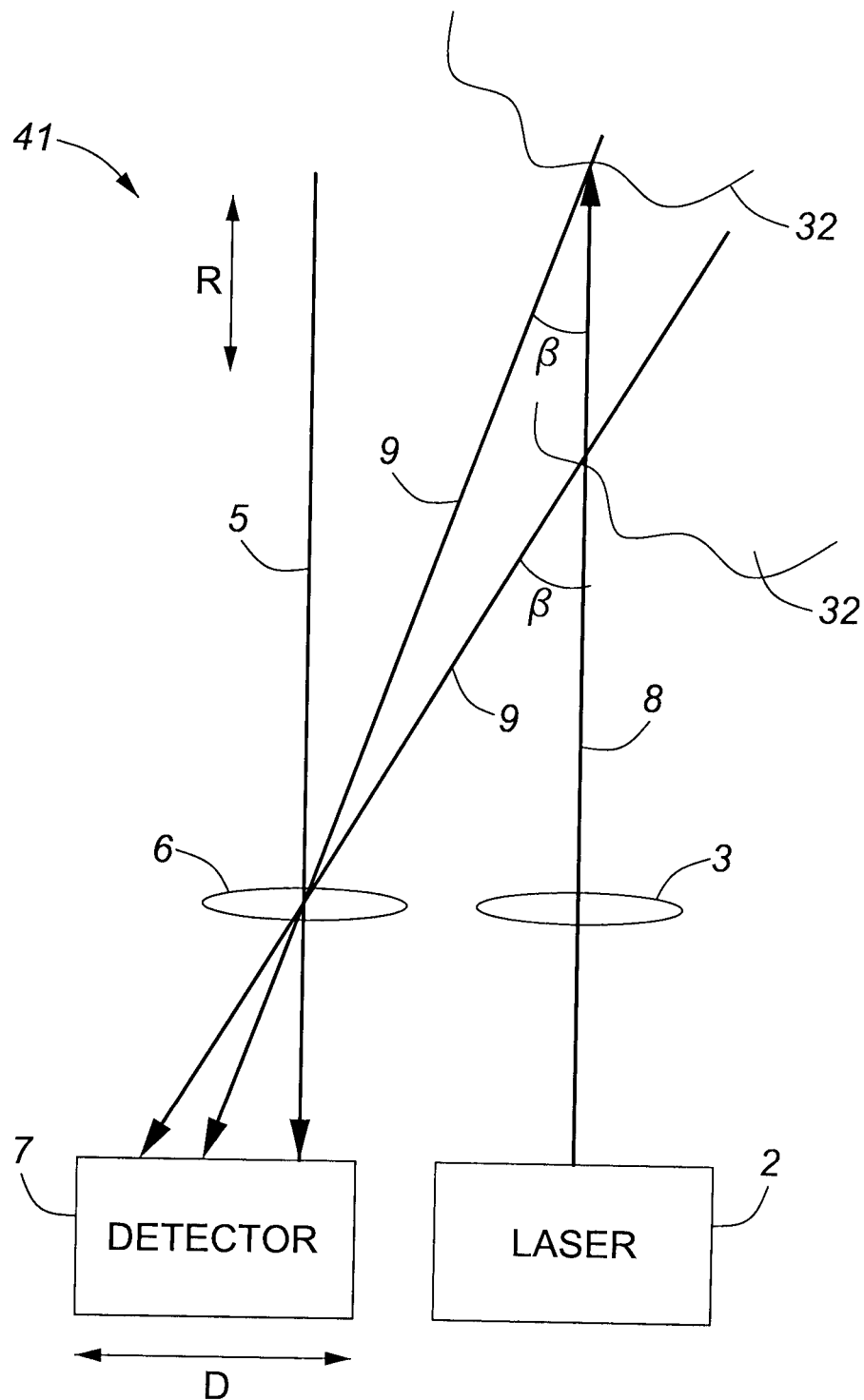
FIG. 4 is a schematic diagram of a conventional triangulation-based LIDAR optical system.

Some approaches have attempted to overcome such disadvantages by employing bistatic LIDAR systems, which separate the launch beam and the return signal in space by employing two different lenses side-by-side. Such bi-static systems measure range using triangulation in which the angle of the beam reflected from an object depends upon the range of the object from the receiving focal plane, such as is shown in prior art FIG. 4 as system 41.

In monostatic optics, while the optical receiving efficiency is very high, the receiving detector 7 will be saturated by the light returned from the aerosol cloud 31. When the detector 7 is saturated, it takes a long time to recover, with the result that the light returned from the object 32 could be missed before the detector 7 recovers and resumes a working status. Further, the area in front of the scanning optics 5 will have many scattered photons lingering therearound since the receiving aspect is also the launching aspect. The beam 8 is at its highest intensity when it comes out of the scanning optics 5 before aerosol attenuation. Lingering photons could eventually be scattered onto the receiving detector 7 causes background problems.

By contrast, in bistatic optics, the optical receiving efficiency can be engineered to be within a certain range so that the problem caused by the detector saturation can be prevented or reduced. As well, there are fewer photons scattered by aerosols near the scanning optics 5.

System 41 comprises a laser source 2, projection lens 3, collection lens 6 and detector array 7. The laser source 2 and the detector 7 are spaced apart by a fixed distance in a bi-static arrangement. Laser beam 8 is projected onto object 32 and the reflected beam 9 is imaged by collection lens 6 onto the detector array 7. When the object 32 moves in the range direction (as indicated by arrow "R"), the corresponding spot image moves laterally (as indicated by arrow "D") along the detector array 7.

In commonly-owned PCT International Application Publication No. WO/2007/025363 entitled "Apparatus and Method for Tracking an Object" filed by Zhu et al. on Mar. 8, 2007, which is incorporated herein by reference in its entirety herein, there is disclosed an apparatus that incorporates a dual-laser LIDAR system having optical paths that are for the most part common. One laser is a continuous beam laser and is employed with a triangulation detector, while the other is a pulsed laser that is employed with a FOV detector. Advantageously, such an apparatus enables the distance between it and the object to be measured for both long and short range distances, and allows the distance to be measured continuously as the distance changes from long to short range or vice versa.

In operation, short range measurements are made using the first beam and first detector based on the triangulation method, while long range measurements are made using the second laser and detector based on the time between launched and received pulses.

The distance can be measured simultaneously using both techniques and the measurement from either technique can be selected, as appropriate, depending on, for example, the accuracy of the technique for the particular distance. Since both techniques can work simultaneously, distance measurements can be made continuously as the distance to the object decreases from long to short range or increases from short to long range.

However, object/aerosol discrimination may be achieved even with a simple monostatic LIDAR apparatus such as is shown schematically in FIG. 2, by applying falling edge detection techniques.

Figure 5:
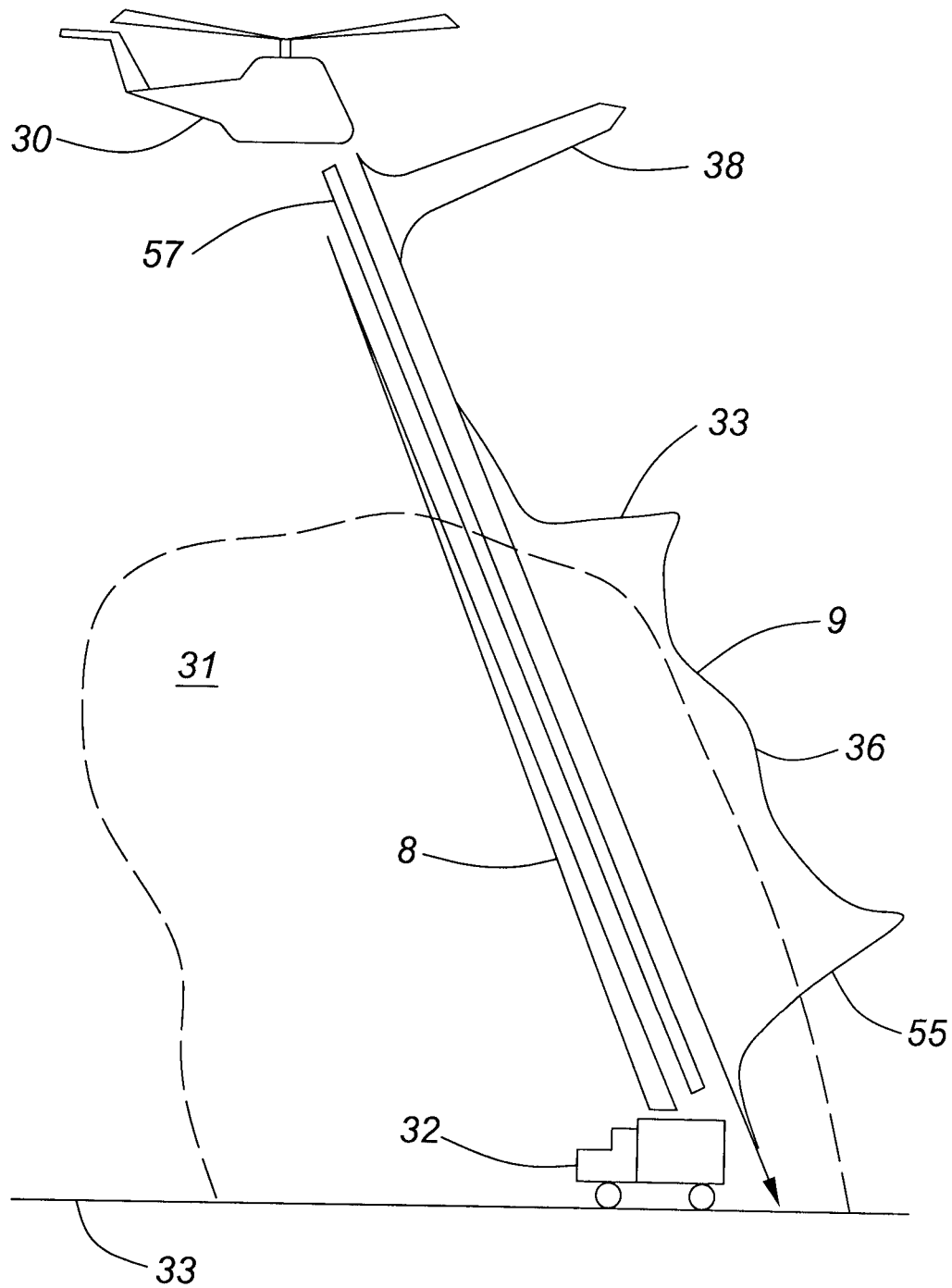
FIG. 5 is a representational depiction of a conventional helicopter-mounted version of the apparatus of FIG. 2 using falling edge detection of an object within an aerosol cloud.

Falling edge detection is schematically shown in FIG. 5, which depicts the response to a conventional helicopter 30 mounted LIDAR conditioned on a falling edge detection, to aerosol cloud (shown as a shaded region) 31 surrounding an object 32, which may be located on the ground 33. It can be seen that the LIDAR return beam measured by the detector in response to the launch laser pulse is still saturated at point 36 corresponding to the nearby aerosol scattering. Again, while the pulse 35 corresponding to the object 32 buried within the aerosol cloud 31 (or hidden behind it) is not separated from the pulse 36 corresponding to the aerosol cloud 31, because the receiver is conditioned on the falling as opposed to the rising edge of the return beam, the range, shown schematically by the solid line, corresponds to the trailing or falling edge 55 of the object 32 as opposed to the aerosol cloud 31, resulting in improved range (shown by solid line 57) estimation of the object 32, even in a typical brown out scenario such as is modeled here.

Conventional rising edge detection generally will not be effective in either monostatic optical or bistatic optical systems if the aerosol cloud 31 lies in front of the object 32.

However, under clear weather conditions, detector saturation is not a problem for rising edge detection since the range is determined by the rising edge of the return pulse 9 before saturation occurs. Accordingly, most conventional LIDARs continue to use rising edge technology.

On the other hand, if there is an aerosol cloud 31 before or surrounding the object 32, bistatic optical systems may provide improved performance.

It will be apparent to those having ordinary skill in this art that where there is an obscuring aerosol cloud, there may be a plurality of discernible falling edges in the return signal 9, only the last one of which may correspond to an object 32.

Those having ordinary skill in this art will readily appreciate that in the absence of any object 32 or aerosol cloud 31, the return signal 9 may not return any discernible falling edge, in which case, the information returned thereby is that the helicopter 30 is free to proceed along such heading for at least a rated distance.

While falling edge detection is known to provide a substantial performance improvement over conventional rising edge detection, known techniques nevertheless still result in a significant false alarm rate (FAR). This is due to the broadening of the return pulse, especially for the falling edge 55 thereof, due to aerosol scattering. A related problem is the difficulty in discriminating between a falling edge 55 due to the presence of an obstacle within or behind the aerosol cloud and a beam termination due to a dense aerosol environment.

Figure 6:
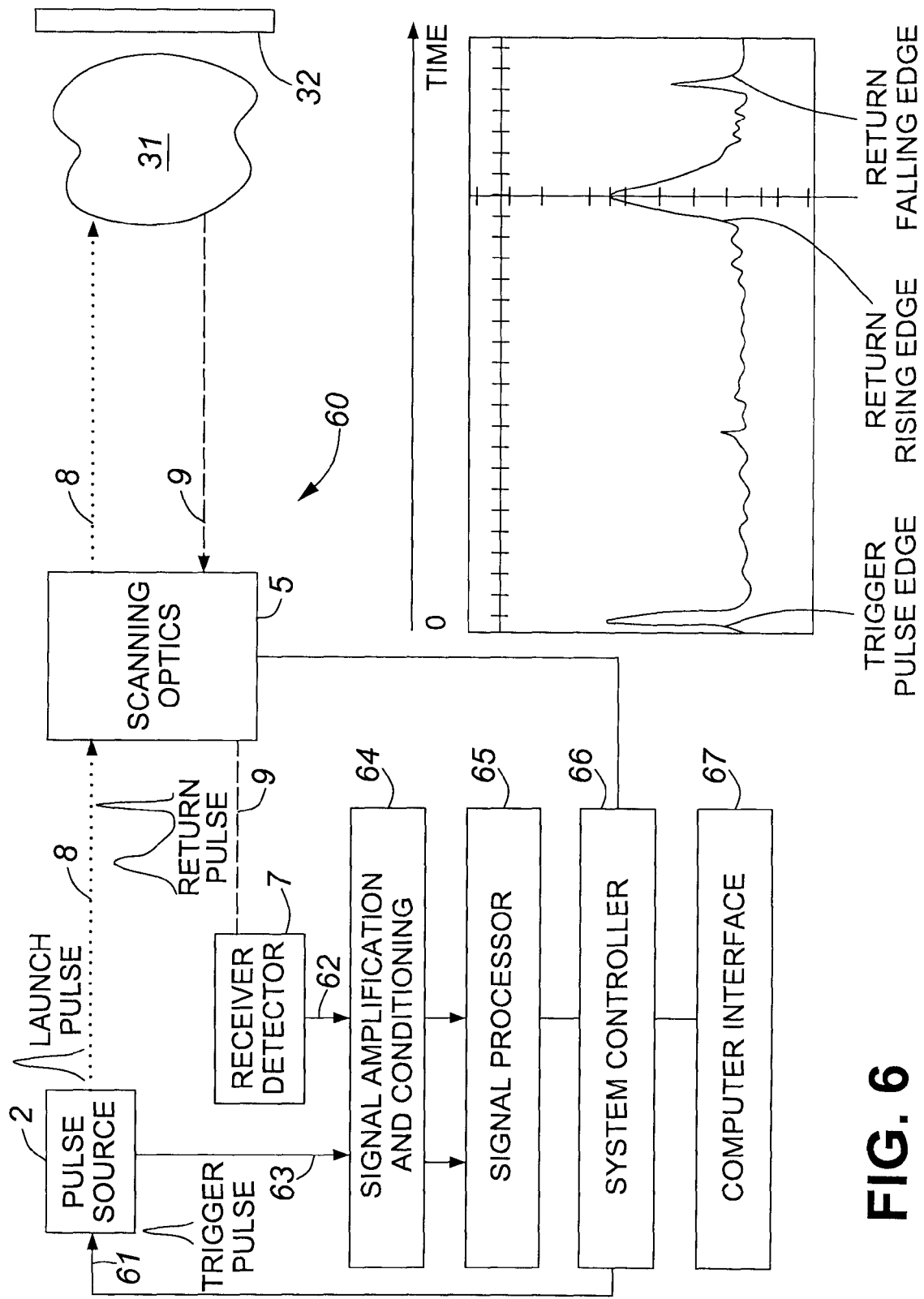
FIG. 6 is a schematic diagram of a LIDAR optical system according to example embodiments of the present disclosure.

FIG. 6 is a simplified flow chart of an example system, shown generally at 60, for processing the return signal 9 reflected from an aerosol cloud 31 and/or an object 32 to discriminate between the two. In the Figure, the object 32 is shown lying behind the aerosol cloud 31. Those having ordinary skill in this art will readily appreciate that the object 32 may lie within the aerosol cloud 31.

A laser source 2 generates a launch pulse 8, typically in response to a trigger pulse 61, which is forwarded to scanning optics 5 and onward to an aerosol cloud 31 and/or object 32. A return signal 9 is obtained by scattering from the aerosol cloud 31 and/or the object 32 and returned through the scanning optics 5 and passed on to a receiver detector 7.

The received return signal 9 is forwarded as signal 62 by the receiver detector 7, together with launch pulse information 63 from the laser source 2, forwarded onto a signal amplification and conditioning module 64 and then onto a signal processor 65, through which one or more of the various techniques described below will be applied in order to discriminate between an aerosol reflection and an object reflection. Additionally, conventional falling edge detection may be applied simultaneously to determine the range of the reflecting surface 31, 32.

The system 60 is controlled by a system controller 66, which may generate the trigger pulse 61 and otherwise coordinate interactions between the laser source 2, the scanning optics 5, the signal processor 65 and a computer interface 67, by which range and object discrimination data may be transmitted and/or displayed for use in landing and/or other operations.

Various techniques will now be described to substantially remove false obstacle signals in LIDAR aerosol signal returns 9. These techniques analyze features of the shape of the return pulses 9 and take advantage of the fact that the aerosol cloud 31, while potentially relatively dense, is nevertheless much less dense than an object 32, so that the return pulses 9 corresponding to an aerosol environment tend to be more diffuse than those reflected off an object 32.

Figure 7:
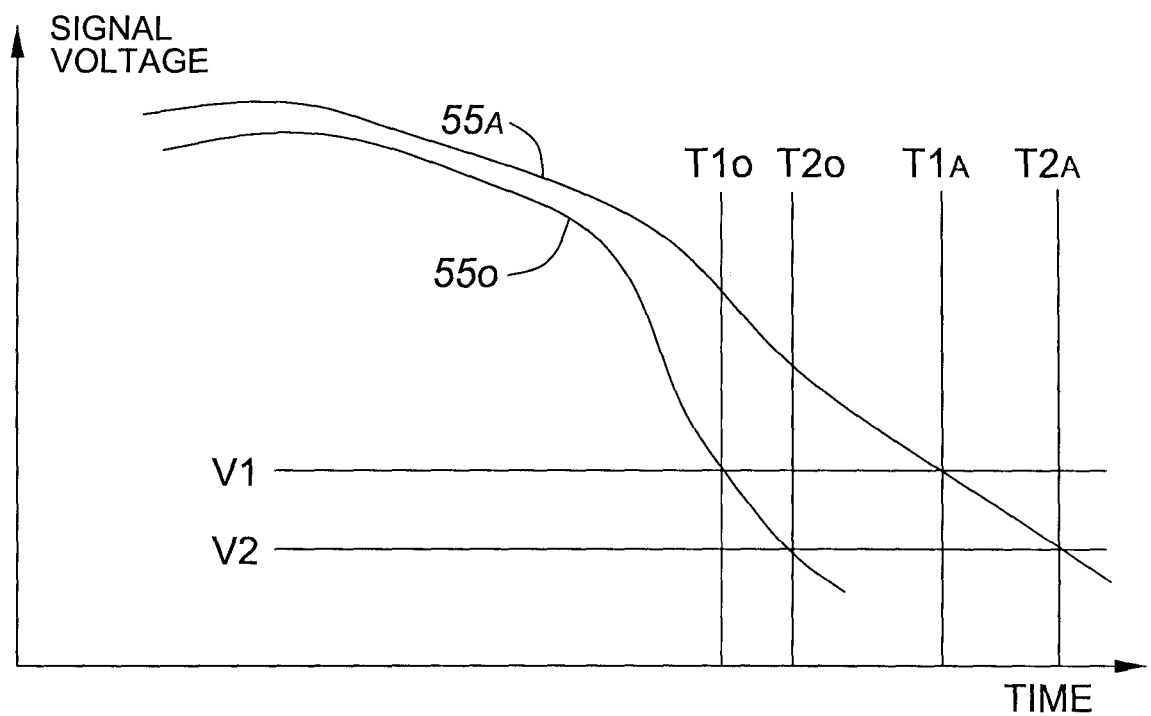
FIG. 7 is a graph of example falling edge signal returns measured by the system of FIG. 6 from an object and from aerosol according to an example embodiment of the present disclosure.

As a result, for example, the return signals 9 from aerosols 31 typically have a falling edge 55 with a smaller slope than returns 9 from objects 32, because the scattering effect tends to elongate the return signal 9. As such, the slope of the falling edge may be used as a discriminator to improve object 32 detection through FAR reduction. Referring now to FIG. 7, the falling edge portion $55_O$ and $55_A$ of the return signal 9 is shown for two scenarios, namely a signal returned from an object 32 and the surrounding aerosol cloud 31 respectively.

The apparatus 60 is configured to compare and time when the return signal 9 falls below a pair of pre-determined threshold voltages V1 and V2. A falling edge may be detected by the higher threshold voltage V1 being triggered in advance of the lower threshold voltage V2.

The slope $\delta_s$ of the falling edge 55 may be determined by taking the voltage difference (equal to the difference between the two threshold voltages V1, V2) and dividing it by the time difference between points T1, T2 when the return signal 9 passes these thresholds:

$$\delta_s = \frac{V1 - V2}{T1 - T2}, \quad (3)$$

and the numerical value of the slope $\delta_s$ may be compared against one or more predetermined threshold values in order to identify the falling edge 55 of the return signal 9 as corresponding to a return from an object 32 or an aerosol cloud 31. If the slope $\delta_s$ exceeds a maximum threshold, the return 9 is characterized as being that of an object 32, while if the slope $\delta_s$ is less than a minimum threshold (which may be the same as the maximum threshold in some embodiments), the return 9 is characterized as being that of an artifact of an aerosol cloud 31.

Figure 8:
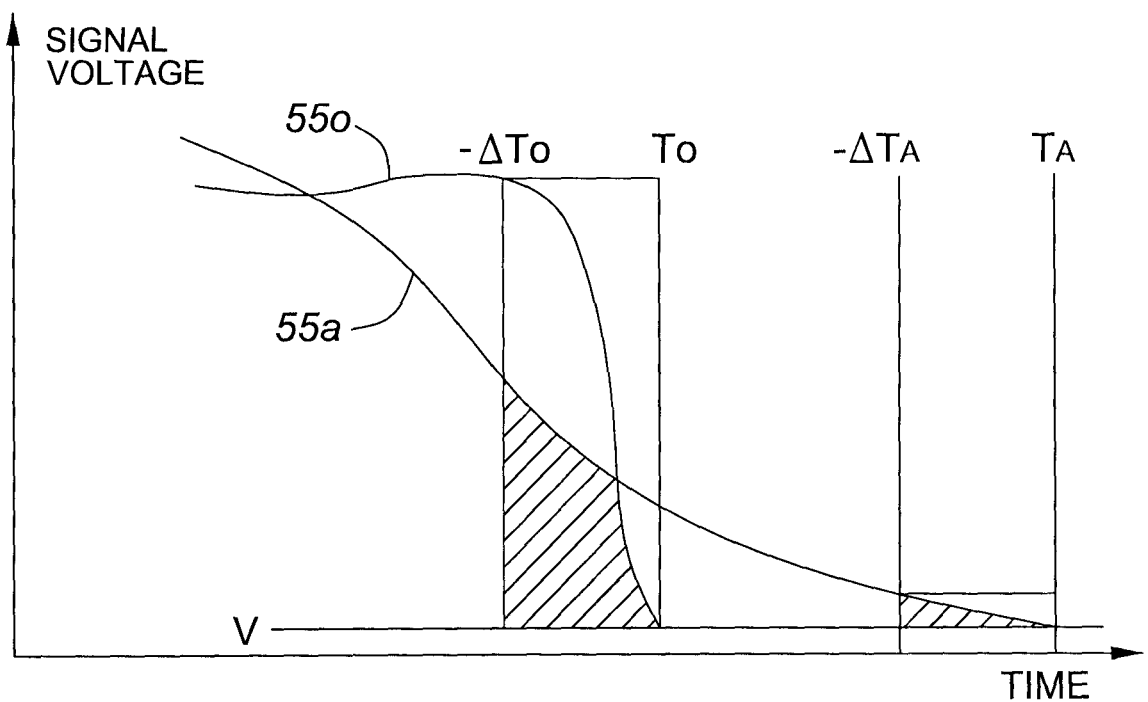
FIG. 8 is a graph of example falling edge signal returns for a return measured by the system of FIG. 6 from an object and from aerosol according to an example embodiment of the present disclosure.

A second but related embodiment is shown in FIG. 8, in which the return signal 9 is compared against a single threshold voltage value V to identify the presence of a falling edge 55. Here however, rather than calculating the slope $\delta_s$ of the falling edge 55 at two threshold values, the integrated power $\delta_i$ in the return signal 9 through the falling edge 55 may be measured by providing an integrator whose output is proportional to the integrated power of the return signal 9. Thus:

$$\delta_i = \int_{-\Delta T}^{T} s(t) \, dt,$$

where s(t) is the return signal 9 function,

T is the point in time at which s(t) intersects with threshold V; and $-\Delta T$ is a predetermined period of time before T.

The integrated power $\delta_i$ may be compared against one or more predetermined threshold values in order to identify the falling edge 55 of the return signal 9 as corresponding to a return from an object 32 or an aerosol cloud 31. If the integrated power $\delta_i$ exceeds a maximum threshold, the return 9 is characterized as being that of an object 32, while if the integrated power $\delta_i$ is less than a minimum threshold (which may be the same as the maximum threshold in some embodiments), the return 9 is characterized as being that of an artifact of an aerosol cloud 31.

Figure 9:
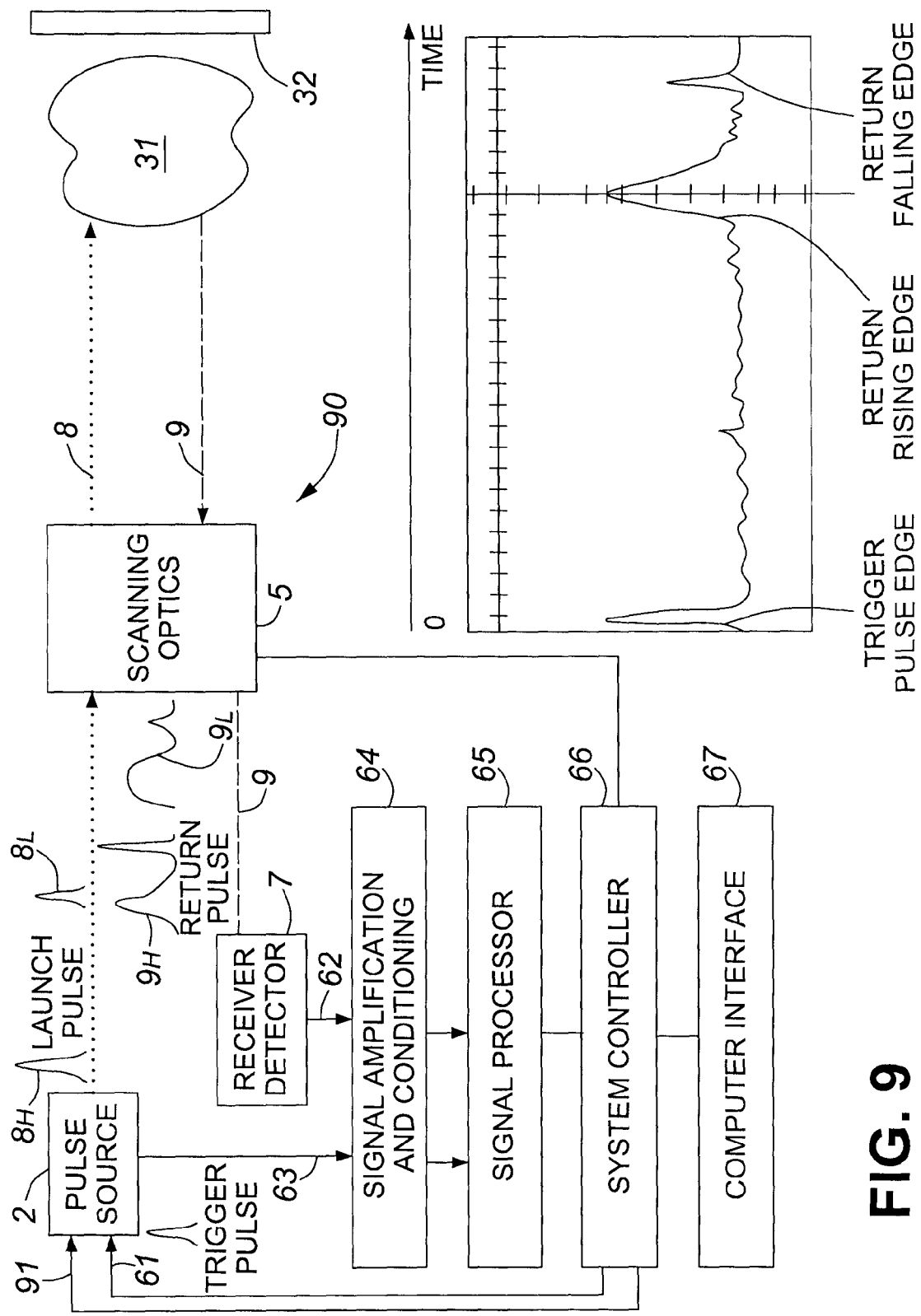
FIG. 9 is a schematic diagram of a LIDAR optical system having high and low transmitted signal power capability according to an example embodiment of the present disclosure.

In FIG. 9, the example system, now shown generally at 90, is configured to generate both a high and a low power signal, in response to a power control signal 91 from the system controller 66.

Figure 10:
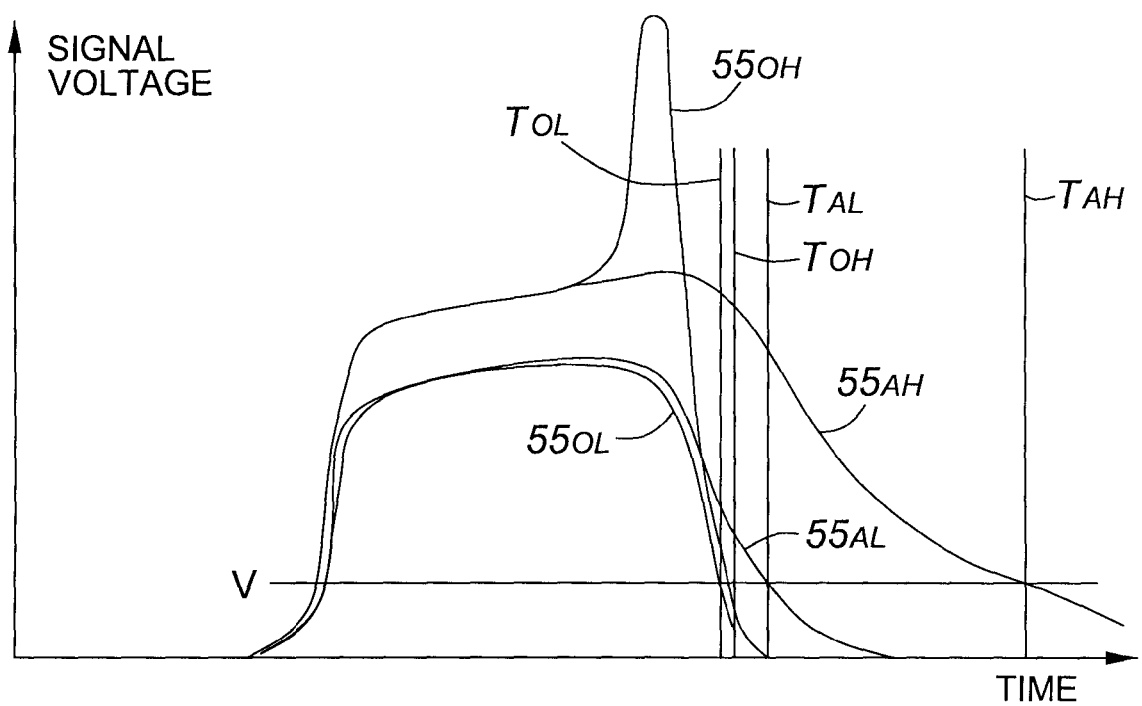
FIG. 10 is a graph of example falling edge signal returns from an object and from aerosol measured by the system of FIG. 9 in response to high and low power signals transmitted by the system according to an example embodiment of the present disclosure.

Turning now to FIG. 10, it may be seen that the return signal 9 corresponding to an object 32 is typically relatively insensitive to the output peak power of the transmitted signal 8, while the return signal 9 corresponding to an aerosol cloud 31 is much more sensitive to output peak power. Put another way, the range reported by the detector 7 corresponding to a falling edge 55 of a return signal 9 reflected from an aerosol cloud will vary relatively widely with different output peak power levels because the transmitted light from a high power transmitted signal 8 will penetrate even deeper within the aerosol cloud 31, while the range reported by the detector 7 corresponding to a return signal 9 reflected from an object 32 will not vary widely if at all, because it will be reflected by a hard object, generally irrespective of the transmitted power 8.

Thus, in a third embodiment, the system 90 may be configured to generate odd and even pulses, for example, by power control signal 91 from the system controller 66, that have high and low output peak power levels respectively. The signal processor 65 is configured to calculate the range detected for a pair of return pulses 9 by calculating the time T that the falling edge 55 crosses a threshold V. Then the detected range difference $\delta_p$ may be compared against one or more threshold values. For purposes of illustration, the falling edge 55 curves shown on FIG. 10 are given a pair of suffixes, the first of which may be A (for aerosol) or O (for object) and the second of which may be H (for high power) or L (for low power). Thus, $$\delta_p = T_{xH} - T_{xL}. \tag{5}$$

If the range difference $\delta_p$ exceeds a maximum threshold, the return 9 is characterized as being that of an aerosol cloud 31, while if the range difference $\delta_p$ is less than a minimum threshold (which may be the same as the maximum threshold in some embodiments), the return 9 is characterized as being that of an object 32.

Those having ordinary skill in this art will appreciate that rather than varying the output peak power of the transmitted signal 8, the pulse length of the transmitted signal 8 may be varied, given the relationship between pulse length and total power, giving rise to a fourth embodiment. Therefore, the threshold crossing times corresponding to big (long) and short output pulses may be considered equivalent respectively to high and low peak power levels, that is, $T_{xB} \approx T_{xH}$ and $T_{xS} \approx T_{xL}$ so that FIG. 10 may be referred to for explanatory purposes. The detected range difference $\delta_l$, where $$\delta_l = T_{xB} - T_{xS}, \tag{6}$$

may be compared against one or more threshold values. Again, If the range difference $\delta_l$ exceeds a maximum threshold, the return 9 is characterized as being that of an aerosol cloud 31, while if the range difference $\delta_l$ is less than a minimum threshold (which may be the same as the maximum threshold in some embodiments), the return 9 is characterized as being that of an object 32.

Figure 11:
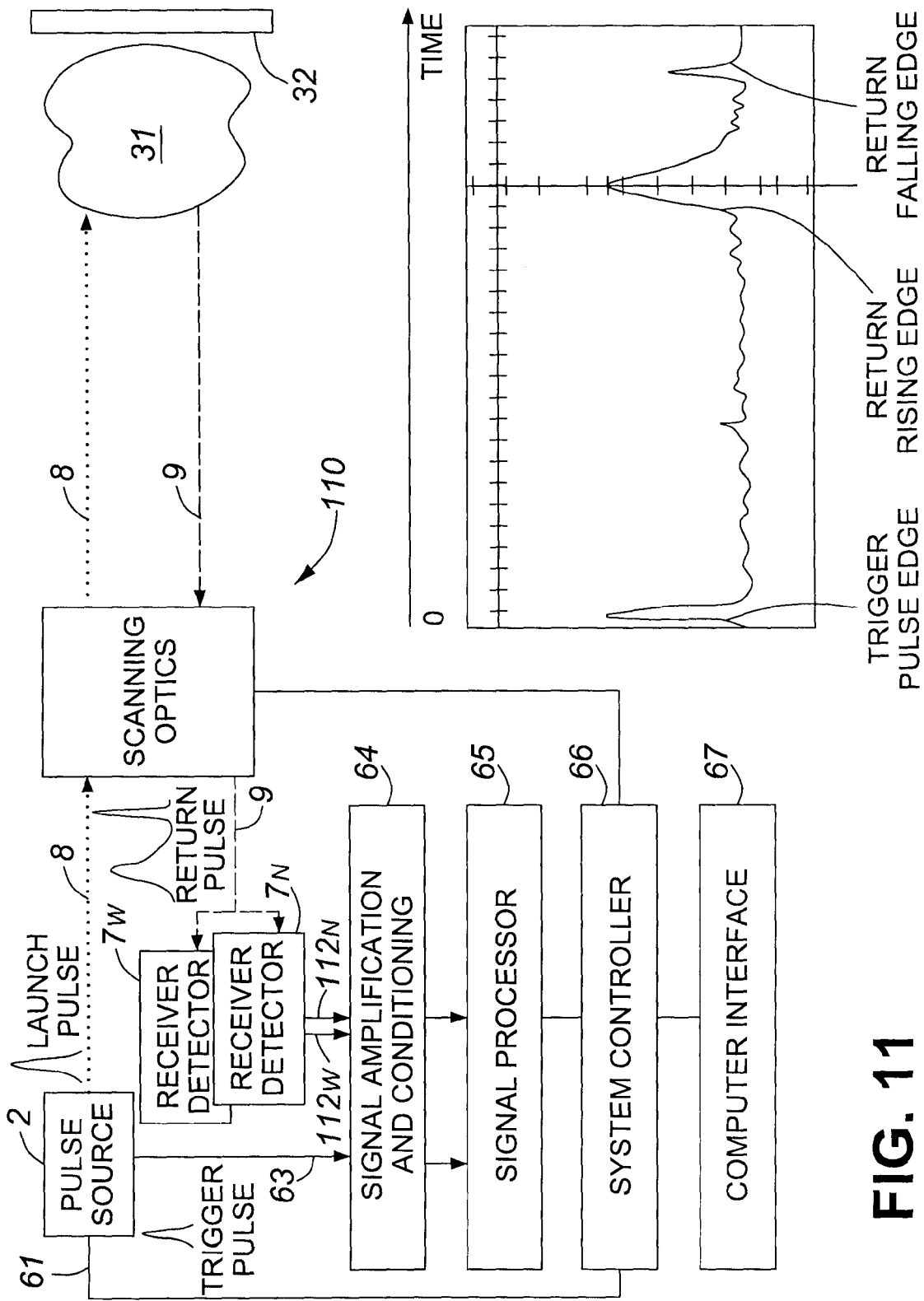
FIG. 11 is a schematic diagram of a LIDAR optical system having small and large FOV receiver detectors according to an example embodiment of the present disclosure.

In FIG. 11, the example system, now shown generally at 110, is configured to split the received signal 9 and feed one part into a first receiver detector 97$_N$ having a narrow FOV and another part into a second receiver detector 97$_W$ having a wide FOV, each of which feed a respective signal 112$_N$ and 112$_W$ to the signal amplification and conditioning module 64.

Figure 12:
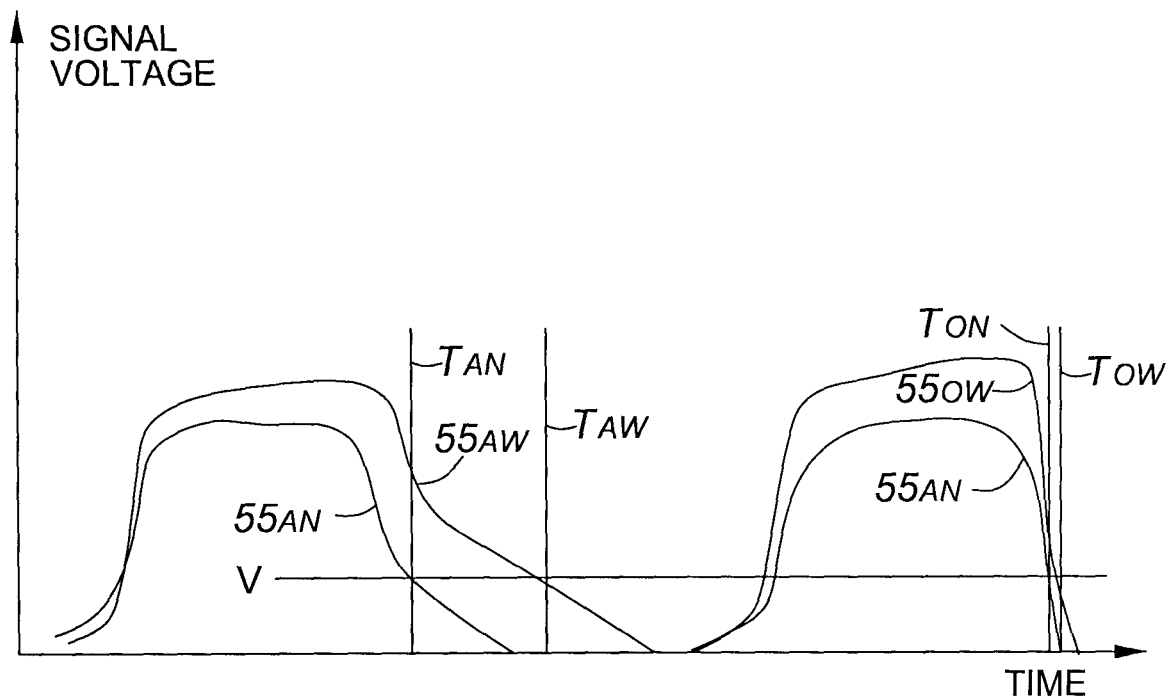
FIG. 12 is a graph of example signal returns from an object and from aerosol measured by the system of FIG. 11 with small and large FOV receiver detectors according to an example embodiment of the present disclosure.

Referring now to FIG. 12, it appears that the FOV of the receiver detector 7 may also be used as a discriminating factor between aerosol and object returns. With a wider FOV (corresponding to curves 55$_{AW}$ and 55$_{OW}$) more scattered light may be detected than with a narrower FOV (corresponding to curves 55$_{AN}$ and 55$_{ON}$). Thus, a receiver detector 97$_W$ with a wider FOV detector may report a greater range from a given return signal 9 than a receiver detector 97$_N$ with a narrower FOV because a wider FOV will receive more light scattered by aerosols and will linger longer. When light is reflected by an object 32 the location of reflected photos is more confined so that there is less of a difference in return phase profile and range reported between a wide and narrow FOV. On the other hand, it is unlikely that significant range differences will be reported for a return signal 9 that corresponds to an object 32 irrespective of the FOV of the receiver detector 7.

Thus, the signal processor 65 is configured to calculate the range detected for a pair of return pulses 112$_N$ and 112$_W$ by calculating the time T that the falling edge 55 crosses a threshold V. Then the detected range difference $\delta_f$ may be compared against one or more threshold values. For purposes of illustration, the falling edge 55 curves shown on FIG. 10 are given a pair of suffixes, the first of which may be A (for aerosol) or O (for object) and the second of which may be W (for wider FOV) or N (for narrower FOV). Thus, $$\delta_f = T_{xW} - T_{xN} \tag{7}$$

If the range difference $\delta_f$ exceeds a maximum threshold, the return 9 is characterized as being that of an aerosol cloud 31, while if the range difference $\delta_f$ is less than a minimum threshold (which may be the same as the maximum threshold in some embodiments), the return 9 is characterized as being that of an object 32.

Those having ordinary skill in the art will appreciate that the falling edge detection and discrimination techniques discussed herein may potentially be employed in conjunction with conventional rising edge detection or other known falling edge detection techniques.

In the foregoing disclosure, for purposes of explanation and not limitation, specific details are set forth such as particular architectures, interfaces, techniques, etc. in order to provide a thorough understanding of the present disclosure. However, it will be apparent to those having ordinary skill in this art that the present disclosure may be practiced in other embodiments that depart from these specific details.

In some instances, detailed descriptions of well-known devices, circuits, and methods are omitted so as not to obscure the description of the present disclosure with unnecessary detail. All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those having ordinary skill in this art that block diagrams reproduced herein can represent conceptual views of illustrative components embodying the principles of the technology.

Similarly, it will be appreciated that any flow charts, state transition diagrams, pseudocode, and the like represent various processes, which may be substantially represented in computer-readable medium and so executed by a computer or processor, whether or not such computer or processor is explicitly shown.

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and methods actions can be performed by a programmable processor executing a program of instructions to perform functions of the disclosure by operating on input data and generating output.

The functions of the various elements including functional blocks labelled as "processors" or "controllers" may be provided through the use of dedicated hardware, as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read-only memory (ROM) for storing software, random access memory (RAM) and non-volatile storage.

The disclosure can be implemented advantageously on a programmable system including at least one input device, and at least one output device. Each computer program can be implemented in a high-level procedural or object-oriented programming language, or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs (digital signal processors).

Examples of such types of computer are programmable processing systems contained in the modules shown in FIG. 6 suitable for implementing or performing the apparatus or methods of the disclosure. The system may comprise a processor, a random access memory, a hard drive controller, and/or an input/output controller, coupled by a processor bus.

It will be apparent to those having ordinary skill in this art that various modifications and variations may be made to the embodiments disclosed herein, consistent with the present disclosure, without departing from the spirit and scope of the present disclosure.

For example, it is conceivable to adapt the return pulse shape analysis techniques disclosed herein to other false alarm reduction techniques for LIDAR and other remote sensing technologies and applications, including without limitation, MMW radar, flash LIDAR, range-gated cameras, radar and sonar.

While preferred embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

Further, the foregoing description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

Also, the term "couple" in any form is intended to mean either an direct or indirect connection through other devices and connections.

Moreover, all dimensions described herein are intended solely to be exemplary for purposes of illustrating certain embodiments and are not intended to limit the scope of the disclosure to any embodiments that may depart from such dimensions as may be specified.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of a device, area and/or volume and/or designated parts thereof.

References in the singular form include the plural and vice versa, unless otherwise noted.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

Certain terms are used throughout to refer to particular components. As one skilled in the art will appreciate, manufacturers may refer to a component by different names. It is not intended to distinguish between components that differ in name but not in function.

The purpose of the Abstract is to enable the relevant patent office and/or the public generally, and especially persons having ordinary skill in the art who are not familiar with patent or legal terms or phraseology, to quickly determine from a cursory inspection the nature of the technical disclosure. The Abstract is neither intended to define the invention of this disclosure, which is measured by its claims, nor is it intended to be limiting as to the scope of this disclosure in any way.

Other embodiments consistent with the present application will become apparent from consideration of the specification and the practice of the disclosure disclosed herein.

What is claimed is:

1. A remote sensing system for obtaining range information about an object in a predetermined direction, the system comprising:
   a pulsed signal source for emitting at least one pulsed signal;
   a transceiver for directing the at least one pulsed signal in the predetermined direction and for receiving at least one return signal associated with the at least one pulsed signal from along the predetermined direction;
   at least one detector, each for gathering the at least one return signal from the transceiver; and
   a signal processor for:
      correlating at least one falling edge of the at least one return signal gathered by each of the at least one detectors, with a falling edge of the at least one pulsed signal and determining therefrom a range from the system to a reflecting entity in the predetermined direction;
      comparing a feature of one of the at least one falling edge of the at least one return signal against at least one threshold to characterize the reflecting entity as being from the object or from an obscuring aerosol cloud; and discarding the range associated with the at least one falling edge of the at least one return signal if the reflecting entity is characterized as being from the aerosol cloud.

2. The remote sensing system according to claim 1, wherein the range is determined by measuring a time difference between the at least one falling edge of the at least one return signal and the falling edge of the at least one pulsed signal.

3. The remote sensing system according to claim 1, wherein the feature of the at least one falling edge of the at least one return signal comprises its negative slope.

4. The remote sensing system according to claim 1, wherein the feature of the at least one falling edge of the at least one return signal comprises an integrated power thereunder.

5. The remote sensing system according to claim 1, wherein the at least one threshold comprises a minimum threshold below which the feature is characteristic of a reflection from an aerosol cloud.

6. The remote sensing system according to claim 1, wherein the at least one threshold comprises a maximum threshold above which the feature is characteristic of a reflection from the object.

7. The remote sensing system according to claim 1, wherein the pulsed signal source is adapted to generate pairs of pulsed signals having different output peak power.

8. The remote sensing system according to claim 7, wherein the feature of the at least one falling edge of the at least one return signal comprises a difference in the range determined from each pulsed signal in the pair and its corresponding at least one return signal.

9. The remote sensing system according to claim 1, wherein the pulsed signal source is adapted to generate pairs of pulsed signals having different pulse length.

10. The remote sensing system according to claim 8, wherein the feature of the at least one falling edge of the at least one return signal comprises a difference in the range determined from each pulsed signal in the pair and its corresponding at least one return signal.

11. The remote sensing system according to claim 1, wherein a first one of the at least one detector has a narrower field of view than a second one of the at least one detector.

12. The remote sensing system according to claim 11, wherein the feature of the at least one falling edge comprises a difference in the range determined from the at least one return signal gathered by each of the at least one detectors and its corresponding pulsed signal.

13. The remote sensing system according to claim 1, wherein the at least one threshold comprises a maximum threshold above which the feature is characteristic of a reflection from an aerosol cloud.

14. The remote sensing system according to claim 1, wherein the at least one threshold comprises a minimum threshold below which the feature is characteristic of a reflection from the object.

15. The remote sensing system according to claim 1, wherein the range information comprises the range to the object.

16. The remote sensing system according to claim 1, wherein if no object is identified, the range information comprises the absence of an object for a predetermined distance in the predetermined direction from the system.

17. The remote sensing system according to claim 1, wherein the at least one pulsed signal is a LIDAR signal.

18. A method for obtaining range information about an object in a predetermined direction, the method comprising steps of:
emitting at least one pulsed signal in the predetermined direction;
receiving at least one return signal associated with the at least one pulsed signal from along the predetermined direction;
gathering the at least one return signal at at least one detector;
correlating at least one falling edge of the at least one return signal gathered by each of the at least one detectors, with a falling edge of the at least one pulsed signal and determining therefrom a range from the system to a reflecting entity in the predetermined direction;
comparing a feature of one of the at least one falling edge of the at least one return signal against at least one threshold to characterize the reflecting entity as being from the object or from an obscuring aerosol cloud;
discarding the range associated with the at least one falling edge of the at least one return signal if the reflecting entity is characterized as being from the aerosol cloud; and
returning either the range associated with the object or the absence of an object for a predetermined distance in the predetermined direction.

19. The method according to claim 18, wherein step of correlating comprises measuring a time difference between the at least one falling edge of the at least one return signal and the falling edge of the at least one pulsed signal.

20. The method according to claim 18, wherein the feature of the at least one falling edge of the at least one return signal comprises its negative slope.

21. The method according to claim 18, wherein the feature of the at least one falling edge of the at least one return signal comprises an integrated power thereunder.

22. The method according to claim 18, wherein the at least one threshold comprises a minimum threshold below which the feature is characteristic of a reflection from an aerosol cloud.

23. The method according to claim 18, wherein the at least one threshold comprises a maximum threshold above which the feature is characteristic of a reflection from the object.

24. The method according to claim 18, wherein the step of emitting comprises emitting pairs of pulsed signals having different output peak power.

25. The method according to claim 24, wherein the feature of the at least one falling edge of the at least one return signal comprises a difference in the range determined from each pulsed signal in the pair and its corresponding at least one return signal.

26. The method according to claim 18, wherein the step of emitting comprises emitting pairs of pulsed signals having different pulse length.

27. The method according to claim 26, wherein the feature of the at least one falling edge of the at least one return signal comprises a difference in the range determined from each pulsed signal in the pair and its corresponding at least one return signal.

28. The method according to claim 18, wherein a first one of the at least one detector has a narrower field of view than a second one of the at least one detector.

29. The method according to claim 28, wherein the feature of the at least one falling edge of the at least one return signal comprises a difference in the range determined from the at least one return signal gathered by each of the at least one detectors and its corresponding pulsed signal.

30. The method according to claim 18, wherein the at least one threshold comprises a maximum threshold above which the feature is characteristic of a reflection from an aerosol cloud.

31. The method according to claim 18, wherein the at least one threshold comprises a minimum threshold below which the feature is characteristic of a reflection from the object.

32. The method according to claim 18, wherein the range information comprises the range to the object.

33. The method according to claim 18, wherein if no object is identified, the range information comprises the absence of an object for a predetermined distance in the predetermined direction from the system.

34. The method according to claim 18, wherein the at least one pulsed signal is a LIDAR signal.

35. A signal processor operatively coupled to a remote sensing system for obtaining range information about an object in a predetermined direction, comprising:
- a correlator for determining, from a falling edge of at least one pulsed signal emitted in the predetermined direction and at least one falling edge of at least one return signal from a reflecting entity associated with the at least one pulsed signal gathered by at least one detector from along the predetermined direction, a range from the system to the reflecting entity in the predetermined direction; and
- a comparator for comparing a feature of each of one of the at least one falling edge of the at least one return signal against at least one threshold to characterize the reflecting entity as being from the object or from an obscuring aerosol cloud, whereupon the range characterized as being from the aerosol cloud is discarded.

36. A non-transitory computer-readable medium in a processor operatively coupled to a remote sensing system for obtaining range information about an object in a predetermined direction, the medium having stored thereon, computer-readable and computer-executable instructions which, when executed by the processor, cause the processor to perform acts comprising:
- determining, from a falling edge of at least one pulsed signal emitted in the predetermined direction and at least one falling edge of at least one return signal from a reflecting entity associated with the at least one pulsed signal gathered by at least one detector from along the predetermined direction, a range from the system to the reflecting entity in the predetermined direction;
- comparing a feature of each of one of the at least one falling edge of the at least one return signal against at least one threshold to characterize the reflecting entity as being from the object or from an obscuring aerosol cloud; and
- discarding the range if the reflecting entity is characterized as being from the aerosol cloud.

* * * * *